United States Patent
Fakoorian et al.

(10) Patent No.: US 12,047,967 B2
(45) Date of Patent: Jul. 23, 2024

(54) ALLOCATION OF UPLINK OPPORTUNITIES TO PUSCH REPETITIONS

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 17/593,330

(22) PCT Filed: Jan. 14, 2021

(86) PCT No.: PCT/CN2021/071818
§ 371 (c)(1),
(2) Date: Sep. 15, 2021

(87) PCT Pub. No.: WO2022/151183
PCT Pub. Date: Jul. 21, 2022

(65) Prior Publication Data
US 2023/0171784 A1   Jun. 1, 2023

(51) Int. Cl.
*H04W 4/00* (2018.01)
*H04L 1/1812* (2023.01)
(Continued)

(52) U.S. Cl.
CPC .......... *H04W 72/23* (2023.01); *H04L 1/1812* (2013.01); *H04W 72/1268* (2013.01)

(58) Field of Classification Search
CPC ... H04W 28/04; H04W 72/04; H04W 72/042; H04W 88/08; H04W 28/08;
(Continued)

(56) References Cited

U.S. PATENT DOCUMENTS

2022/0007412 A1*   1/2022   Rico Alvarino ...... H04L 1/1657
2022/0104224 A1*   3/2022   Choi .................... H04L 5/0094
(Continued)

FOREIGN PATENT DOCUMENTS

| CN | 110876199 | 3/2020 |
|---|---|---|
| CN | 110999155 | 4/2020 |
| WO | 2020/033884 | 2/2020 |

OTHER PUBLICATIONS

Qualcomm, "Remaining issues on PUSCH enhancements for URLLC", 3GPP TSG RAN WG1 #200b e-Meeting, R1-2002546, Apr. 30, 2020, 4 sheets.

*Primary Examiner* — Phuongchau Ba Nguyen
(74) *Attorney, Agent, or Firm* — Fay Kaplun & Marcin, LLP

(57) ABSTRACT

A user equipment (UE) is configured to transmit physical uplink shared channel (PUSCH) transmissions having repetitions. The UE receives a first downlink control information (DCI) transmission from a base station of the wireless network, wherein the first DCI transmission schedules a first physical uplink shared channel (PUSCH) transmission having repetitions, transmits the PUSCH transmission with the one or more repetitions, receives a second DCI transmission from the base station, wherein the second DCI transmission
(Continued)

indicates that the UE should modify the repetitions of the first PUSCH transmission and modifies the repetitions of the first PUSCH transmission.

17 Claims, 3 Drawing Sheets

(51) Int. Cl.
*H04W 72/1268* (2023.01)
*H04W 72/23* (2023.01)

(58) Field of Classification Search
CPC ... H04W 28/084; H04W 36/22; H04W 72/12; H04W 72/23; H04W 72/1268; H04L 5/0007; H04L 1/1812; H04L 5/0044; H04L 1/1822; H04L 1/1887; H04L 1/08
See application file for complete search history.

(56) References Cited

U.S. PATENT DOCUMENTS

| | | | |
|---|---|---|---|
| 2022/0183033 A1* | 6/2022 | Huang | H04W 72/0446 |
| 2023/0276438 A1* | 8/2023 | Rudolf | H04W 52/245 |
| 2023/0403702 A1* | 12/2023 | Su | H04W 28/18 |
| 2024/0057060 A1* | 2/2024 | Li | H04L 5/0044 |

* cited by examiner

ALLOCATION OF UPLINK OPPORTUNITIES TO PUSCH REPETITIONS

BACKGROUND

In 5G new radio (NR) wireless communications, Type-A physical uplink shared channel (PUSCH) transmissions may include repetitions of the PUSCH transmission to ensure proper reception by a base station (g-NodeB) of the 5G NR wireless network. Those repetitions are typically repeated on consecutive slots and on the same symbols in each slot.

In 5G NR wireless communications, a UE may receive a first downlink control information (DCI) transmission from a next generation NodeB (gNB) of the 5G NR network to schedule the transmission of a PUSCH by the UE. This scheduling includes scheduling of the PUSCH repetitions. As noted above, Type-A PUSCH repetitions are typically scheduled for consecutive slots and on the same set of symbols in each slot given by the start and length indicator value (SLIV). However, in the unpaired spectrum (time division duplexing (TDD)), a PUSCH repetition may be dropped if any symbol in the set of symbols is a semi-status downlink symbol (D). In addition, if the UE is configured to monitor DCI Format 2_0, which includes a dynamic slot format indicator (SFI), error cases arise when a dynamic grant (DG) PUSCH conflicts with a dynamic D symbol or when the first PUSCH and all of its type-2 configured grant (CG) PUSCH repetitions conflict with a D/X symbol (where an X symbol represents a flexible symbol where a UE may be scheduled to receive or transmit). For Type-1 CG PUSCHs and all Type-2 CG PUSCHs (except the first PUSCH and its repetitions), the UE may drop any PUSCH repetition that conflicts with a D/X symbol.

SUMMARY

Some exemplary embodiments are related to a processor of a user equipment (UE) configured to perform operations. The operations include receiving a first downlink control information (DCI) transmission from a base station of the wireless network, wherein the first DCI transmission schedules a first physical uplink shared channel (PUSCH) transmission having repetitions, transmitting the PUSCH transmission with the one or more repetitions, receiving a second DCI transmission from the base station, wherein the second DCI transmission indicates that the UE should modify the repetitions of the first PUSCH transmission and modifying the repetitions of the first PUSCH transmission.

Other exemplary embodiments are related to a user equipment (UE) having a transceiver configured to communicate with a wireless network and a processor communicatively coupled to the transceiver and configured to perform operations. The operations include comprising receiving a first downlink control information (DCI) transmission from a base station of the wireless network, wherein the first DCI transmission schedules a first physical uplink shared channel (PUSCH) transmission having repetitions, transmitting the PUSCH transmission with the one or more repetitions, receiving a second DCI transmission from the base station, wherein the second DCI transmission indicates that the UE should modify the repetitions of the first PUSCH transmission and modifying the repetitions of the first PUSCH transmission.

Still further exemplary embodiments are related to a processor of a base station configured to perform operations. The operations include transmitting a first downlink control information (DCI) transmission from a base station of the wireless network, wherein the first DCI transmission schedules a first physical uplink shared channel (PUSCH) transmission having repetitions, receiving the PUSCH transmission with the one or more repetitions and transmitting a second DCI transmission from the base station, wherein the second DCI transmission indicates that the UE should modify the repetitions of the first PUSCH transmission.

DETAILED DESCRIPTION

Figure 1:
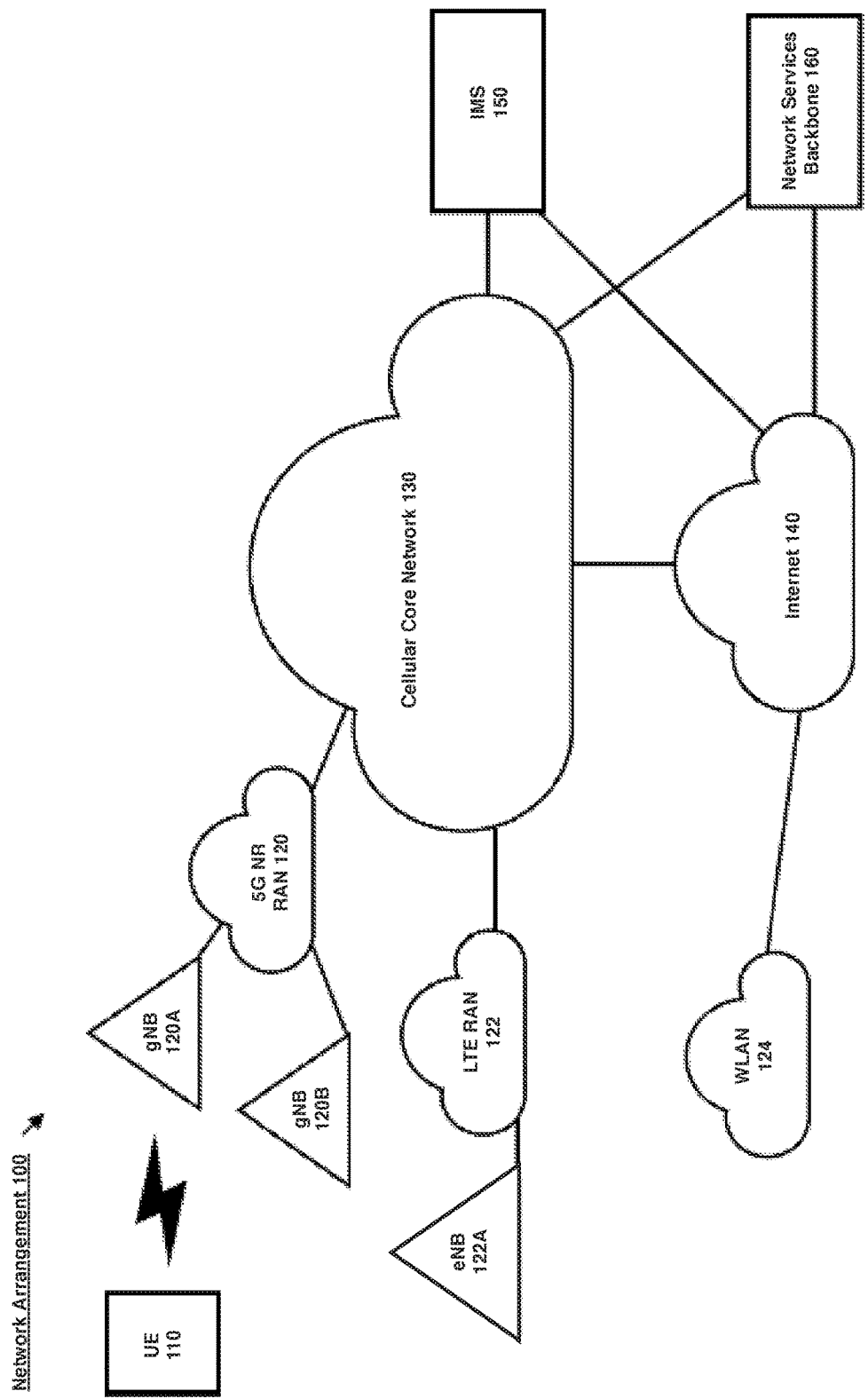
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) handling physical uplink shared channel (PUSCH) transmission repetitions upon reception of a new downlink control information (DCI) transmission that schedules new PUSCH transmission repetitions which conflict with one or more of the original PUSCH repetitions.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio (NR) radio access technology (RAT). However, while the exemplary embodiments are described with reference to a 5G NR RAT, it should be understood that the exemplary embodiments may also be implemented for other types of networks, e.g., Long Term Evolution (LTE) networks, next generation networks, etc.

In current 5G NR wireless communications, for a given hybrid automatic repeat request (HARQ) process, the gNB is not permitted to schedule the UE to transmit a second PUSCH using DCI Format 0_0, 0_1, or 0_2 scrambled by a cell radio network temporary identifier (C-RNTI) or modulation and coding scheme (MCS)-C-RNTI until after the last repetition of a first PUSCH having the same HARQ process ID. In addition, a second physical downlink control channel (PDCCH) transmission that begins after the end of a first PDCCH transmission cannot schedule a PUSCH transmission before the end of a PUSCH transmission scheduled by the first PDCCH. As a result, the gNB cannot communicate to the UE whether the number of repetitions is sufficient, too few, or too many until after all of the repetitions have been transmitted.

According to some exemplary embodiments, a UE modifies the PUSCH repetitions scheduled by a first DCI when it receives a second DCI. The modification may include increasing or decreasing the number of previously scheduled PUSCH repetitions. In some cases, the second DCI may indicate that the UE should terminate the previously scheduled PUSCH repetitions. If the second DCI schedules a second PUSCH transmission, the modification may include dropping and/or deferring previously scheduled PUSCH transmissions with which the second PUSCH transmission conflicts.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network.

Figure 2:
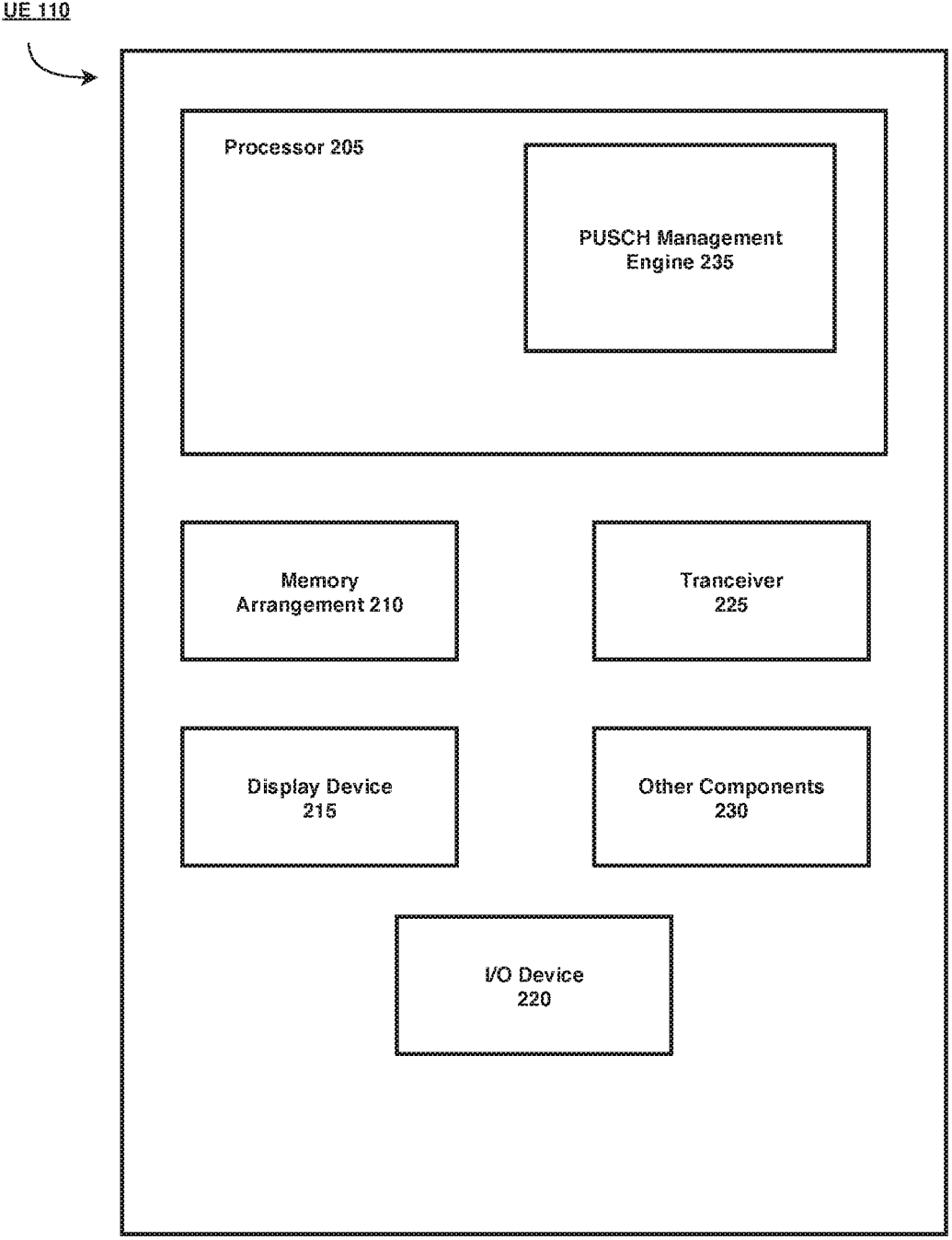
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a PUSCH management engine 235. The PUSCH management engine 235 may perform various operations related to managing previously scheduled PUSCH repetitions upon receipt of a second DCI.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
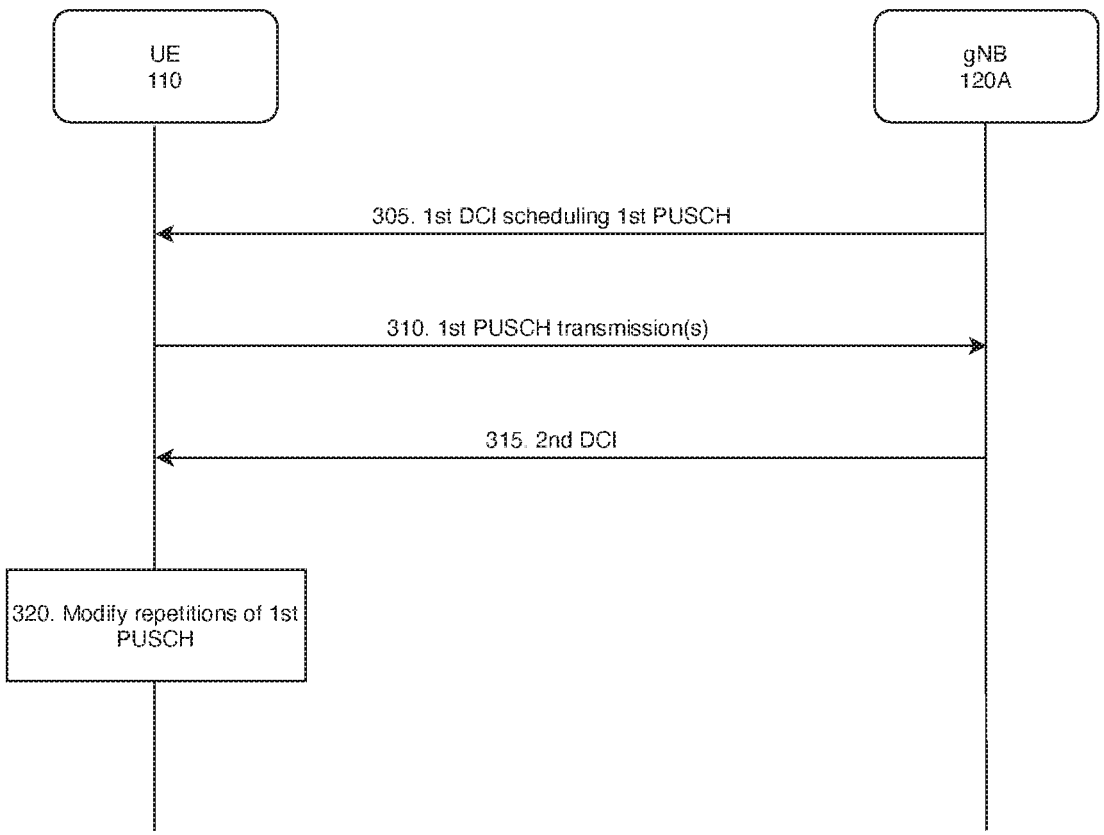
FIG. 3 shows a signaling diagram illustrating a process of handling of physical uplink shared channel (PUSCH) repetitions upon reception of a second downlink control information (DCI) transmission according to various exemplary embodiments.

FIG. 3 shows a signaling diagram illustrating a process of handling of physical uplink shared channel PUSCH repetitions upon reception of a second DCI transmission according to various exemplary embodiments. At 305, the gNB 120A (or 120B) transmits a first DCI to the UE 110 to schedule a first PUSCH transmission. In some embodiments, the first PUSCH transmission includes a plurality of repetitions. At 310, the UE 110 transmits the scheduled PUSCH and repetitions. During the transmission of the scheduled PUSCH and repetitions, the UE 110, at 315, receives a second DCI. For example, assuming a slot format of UDSU, where U is an uplink slot, D is a downlink slot, and S is a special slot, the UE 110 transmits the first repetition of the first PUSCH in the first U slot, but before it can send the second repetition at the second U slot, it receives the second DCI at the D slot. This DCI may indicate that the UE 110 should make some modification to the first PUSCH. At 320, the UE 110 modifies the repetitions of the first PUSCH.

In some embodiments, in the unpaired spectrum (time division duplexing (TDD)), if the second DCI is a unicast DCI (e.g., DCI Format 0_0, 0_1, or 0_2) that schedules the transmission of a second PUSCH having the same hybrid automatic repeat request (HARQ) process ID as the first PUSCH in a slot (or slots) in which one (or more) of the repetitions of the first PUSCH is scheduled, the modification at 320 is the overriding of the repetitions of the first PUSCH occurring after reception of the second DCI at 315. In the above example, the UE 110 would override the repetition scheduled for the second U slot. In such a scenario, a new data indicator (NDI) in the second DCI indicates whether a new transport block (TB) with the same HARQ process ID is used or whether transmission of the current TB is updated. For example, if the NDI indicates that the same TB is used, then the UE 110 modifies the number of repetitions of the first PUSCH. However, if the NDI indicates that a different TB is used, then the UE 110 terminates the previously scheduled repetitions of the first PUSCH and starts a new TB with the same HARQ process ID. In some embodiments, the gNB 120A is not permitted to make any modifications to the current HARQ process ID PUSCH transmission (the first PUSCH) until after the last repetition of the first PUSCH has ended.

In some embodiments, the second DCI may alternatively indicate the early termination of the repetitions of the first PUSCH without scheduling a second PUSCH. In some embodiments, the second DCI may indicate this early termination by setting all modulation and coding scheme (MCS) bits to 1, configuring a frequency domain resource assignment (FDRA) to indicate an invalid allocation, and/or setting all redundancy version (RV) or NDI bits to a fixed value (0 or 1). As a result, the modification at 320 is the early termination of the repetitions of the first PUSCH. In some embodiments, when intra-band carrier aggregation (CA) exists, the second DCI may alternatively or additionally indicate the scheduling of a second PUSCH over a different beam than that of the first PUSCH. This also acts as a termination of the previously scheduled first PUSCH (in the case of intra-band CA).

In some embodiments, the second DCI at 315 may be a group common (GC) DCI format 2_0 that indicates a dynamic SFI and where some of the symbols on which the repetitions of the first PUSCH are transmitted are indicated as D. In such a scenario, the GC DCI 2_0 may indicate that the repetition in the D slot should be dropped by the UE 110 at 320. In some embodiments, the dropped repetition may be deferred to a later U slot. In some embodiments, the dropped repetition may simply count as one of the repetitions without deferral. In some embodiments, the modification at 320 may alternatively include dropping all repetitions of the first PUSCH after reception of the second DCI without deferral. The determination of whether to drop just the conflicting repetition or all of the repetitions may be indicated to the UE 110 using a dynamic indication (e.g., an extra bit in the second DCI) or via higher layer signaling (e.g., via radio resource control (RRC) signaling).

In some embodiments, for any two HARQ IDs, the second DCI at 315 schedules a second PUSCH that overlaps in time with any repetitions of the first PUSCH, the modification at 320 includes dropping repetitions of the first PUSCH that overlap with the second PUSCH (the second DCI overrides the first DCI in the overlapping instances) and the non-overlapping repetitions are not dropped. In some embodiments, the dropped repetitions may be deferred to later U slots. In some embodiments, the dropped repetitions may alternatively be counted towards the number of scheduled repetitions of the first PUSCH (no deferral). In some embodiments, the modification at 320 may alternatively include dropping all of the remaining repetitions of the first PUSCH after receipt of the second DCI (the second DCI overrides the first DCI) with no deferral of the dropped repetitions. In some embodiments, the gNB 120A may alternatively not be permitted to transmit a DCI that schedules a PUSCH transmission which overlaps with any repetitions of a PUSCH scheduled by a previous DCI.

Figure 4:
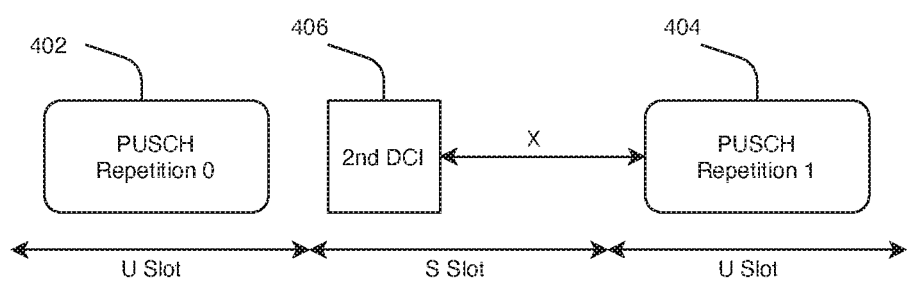
FIG. 4 shows a diagram illustrating a timing gap requirement for processing of a second DCI according to various exemplary embodiments.

FIG. 4 shows a diagram illustrating a timing gap requirement for processing of a second DCI according to various exemplary embodiments. In some embodiments, when a second DCI 406 (similar to the second DCI discussed above) is received in an S slot (or D slot) after a PUSCH repetition 402 in a first U slot, the UE 110 will not process the second DCI 406 unless the second DCI 406 is received at a time greater than or equal to X symbols prior to the start of the PUSCH repetition 404 following the second DCI. The value of X may depend on the UE capability, subcarrier spacing, etc. In some embodiments, X may be equivalent to the N2 gap between the end of a PDCCH transmission and the beginning of a PUSCH transmission as defined in current 3GPP standards.

Examples

In a first example, a user equipment (UE) comprising a transceiver configured to communicate with a wireless network and a processor communicatively coupled to the transceiver and configured to perform operations is provided. The operations comprise receiving a first downlink control information (DCI) transmission from a base station of the wireless network, wherein the first DCI transmission schedules a first physical uplink shared channel (PUSCH) transmission having repetitions, transmitting the PUSCH transmission with the one or more repetitions, receiving a second DCI transmission from the base station, wherein the second DCI transmission indicates that the UE should modify the repetitions of the first PUSCH transmission and modifying the repetitions of the first PUSCH transmission.

In a second example, the UE of the first example, wherein the operations further comprise processing the second DCI only if the second DCI is received at a time equal to or greater than a predetermined number of symbols prior to a beginning of a subsequent repetition of the first PUSCH transmission, wherein the transceiver communicates with the wireless network over the unpaired spectrum.

In a third example, the UE of the second example, wherein the second DCI transmission is one of a DCI Format 0_0, DCI Format 0_1, or DCI Format 0_2.

In a fourth example, the UE of the third example, wherein the second DCI transmission schedules a second PUSCH transmission having a same hybrid automatic repeat request (HARQ) process ID as the first PUSCH transmission, and wherein the second PUSCH transmission is scheduled in at least one slot in which one of the repetitions of the first PUSCH transmission is scheduled.

In a fifth example, the UE of the fourth example, wherein modifying the repetitions of the first PUSCH transmission includes dropping the repetitions of the first PUSCH transmission subsequent to receipt of the second DCI.

In a sixth example, the UE of the fourth example, wherein, when a new data indicator (NDI) of the second DCI indicates a new transport block (TB), modifying the repetitions of the first PUSCH transmission includes terminating the repetitions of the first PUSCH transmission, and wherein, when the NDI indicates the same TB, modifying the repetitions of the first PUSCH transmission includes modifying the number of repetitions.

In a seventh example, the UE of the third example, wherein the second DCI transmission indicates an early termination of repetitions of the first PUSCH transmission, and wherein modifying the repetitions of the first PUSCH transmission includes terminating the repetitions of the first PUSCH transmission.

In an eighth example, the UE of the seventh example, wherein the early termination is indicated by an invalid second PUSCH allocation.

In a ninth example, the UE of the eighth example, wherein the invalid second PUSCH allocation is indicated by at least one of (a) all modulation and coding scheme (MCS) bits in the second DCI set to 1, (b) a frequency domain resource assignment (FDRA) configuration indicating an invalid PUSCH allocation, and (c) all redundancy version (RV) or NDI bits set to a fixed value of 0 or 1.

In a tenth example, the UE of the seventh example, wherein the early termination is indicated a configuration of a second PUSCH transmission on a beam different than that of the first PUSCH transmission when intra-band carrier aggregation (CA) exists.

In an eleventh example, the UE of the third example, wherein when the second DCI schedules transmission of a second PUSCH transmission in a slot that overlaps in time with any of the repetitions of the first PUSCH transmission, modifying the repetitions of the first PUSCH transmission includes dropping overlapping ones of the repetitions of the first PUSCH transmission.

In a twelfth example, the UE of the eleventh example, wherein the repetitions of the first PUSCH transmission that are dropped are deferred to later uplink (U) slots.

In a thirteenth example, the UE of the eleventh example, wherein modifying the repetitions of the first PUSCH transmission further includes dropping all of the repetitions of the first PUSCH transmission subsequent to receipt of the second DCI.

In a fourteenth example, the UE of the second example, wherein the second DCI is a group common (GC) DCI Format 2_0 that provides a dynamic slot format indication (SFI) in which one or more symbols on which the repetitions of the first PUSCH are scheduled are designated as downlink (D) symbols, and wherein modifying the repetitions of the first PUSCH transmission includes dropping the repetitions of the first PUSCH transmission corresponding to the one or more symbols.

In a fifteenth example, the UE of the fourteenth example, wherein the repetitions of the first PUSCH transmission which are dropped are deferred to later uplink (U) slots.

In a sixteenth example, the UE of the fifteenth example, wherein modifying the repetitions of the first PUSCH transmission further includes dropping all of the repetitions of the first PUSCH transmission subsequent to receipt of the second DCI.

In a seventeenth example, a base station of a 5G new radio (NR) wireless network comprising a transceiver configured to connect to a user equipment (UE) and a processor communicatively coupled to the transceiver and configured to perform operations is provided. Then operations comprise transmitting a first downlink control information (DCI) transmission from a base station of the wireless network, wherein the first DCI transmission schedules a first physical uplink shared channel (PUSCH) transmission having repetitions, receiving the PUSCH transmission with the one or more repetitions and transmitting a second DCI transmission from the base station, wherein the second DCI transmission indicates that the UE should modify the repetitions of the first PUSCH transmission.

In an eighteenth example, the base station of the seventeenth example, wherein the transceiver communicates with the UE over the unpaired spectrum.

In a nineteenth example, the base station of the eighteenth example, wherein the second DCI transmission is one of a DCI Format 0_0, 0_1, or 0_2.

In a twentieth example, the base station of the nineteenth example, wherein the second DCI transmission schedules a second PUSCH transmission having a same hybrid automatic repeat request (HARQ) process ID as the first PUSCH transmission, and wherein the second PUSCH transmission is scheduled in at least one slot in which one of the repetitions of the first PUSCH transmission is scheduled.

In a twenty first example, the base station of the nineteenth example, wherein the second DCI transmission indicates an early termination of repetitions of the first PUSCH transmission.

In a twenty second example, the base station of the twenty first example, wherein the early termination is indicated by an invalid second PUSCH allocation.

In a twenty third example, the base station of the twenty second example, wherein the invalid second PUSCH allocation is indicated by at least one of (a) all modulation and coding scheme (MCS) bits in the second DCI set to 1, (b) a frequency domain resource assignment (FDRA) configuration indicating an invalid PUSCH allocation, and (c) all redundancy version (RV) or NDI bits set to a fixed value of 0 or 1.

In a twenty fourth example, the base station of the twenty first example, wherein the early termination is indicated by configuring a second PUSCH transmission on a beam different than that of the first PUSCH transmission when intra-band carrier aggregation (CA) exists.

In a twenty fifth example, the base station of the nineteenth example, wherein the second DCI schedules transmission of a second PUSCH transmission in a slot that overlaps in time with any of the repetitions of the first PUSCH transmission.

In a twenty sixth example, the base station of the eighteenth example, wherein the second DCI is a group common (GC) DCI Format 2_0 that provides a dynamic slot format indication (SFI) in which one or more symbols on which the repetitions of the first PUSCH are scheduled are designated as downlink (D) symbols.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising instructions that when executed by a processor of a user equipment (UE) cause the processor to perform operations comprising:
    receiving a first downlink control information (DCI) transmission from a base station of a wireless network, wherein the first DCI transmission schedules a first physical uplink shared channel (PUSCH) transmission having repetitions;
    transmitting the PUSCH transmission with one or more repetitions;
    receiving a second DCI transmission from the base station, wherein the second DCI transmission indicates the UE modify the repetitions of the first PUSCH transmission; and
    modifying the repetitions of the first PUSCH transmission, wherein the second DCI is a group common (GC) DCI Format 2_0 that provides a dynamic slot format indication (SFI) in which one or more symbols on which the repetitions of the first PUSCH are scheduled are designated as downlink (D) symbols, and wherein modifying the repetitions of the first PUSCH transmission includes dropping the repetitions of the first PUSCH transmission.

2. The non-transitory computer readable storage medium of claim 1, wherein
    the second DCI is received at a time having a number of symbols equal to or greater than a predetermined number of symbols prior to a beginning of a subsequent repetition of the first PUSCH transmission.

3. The non-transitory computer readable storage medium of claim 2, wherein the second DCI transmission is one of a DCI Format 0_0, DCI Format 0_1, or DCI Format 0_2.

4. The non-transitory computer readable storage medium of claim 3, wherein the second DCI transmission schedules a second PUSCH transmission having a same hybrid automatic repeat request (HARQ) process ID as the first PUSCH transmission, and wherein the second PUSCH transmission is scheduled in at least one slot in which one of the repetitions of the first PUSCH transmission is scheduled.

5. The non-transitory computer readable storage medium of claim 4, wherein modifying the repetitions of the first PUSCH transmission includes dropping the repetitions of the first PUSCH transmission subsequent to receipt of the second DCI.

6. The non-transitory computer readable storage medium of claim 4, wherein, when a new data indicator (NDI) of the second DCI indicates a new transport block (TB), modifying the repetitions of the first PUSCH transmission includes terminating the repetitions of the first PUSCH transmission, and wherein, when the NDI indicates the same TB, modifying the repetitions of the first PUSCH transmission includes modifying the number of repetitions.

7. The non-transitory computer readable storage medium of claim 3, wherein the second DCI transmission indicates an early termination of repetitions of the first PUSCH transmission, and wherein modifying the repetitions of the first PUSCH transmission includes terminating the repetitions of the first PUSCH transmission.

8. The non-transitory computer readable storage medium of claim 7, wherein the early termination is indicated by an invalid second PUSCH allocation.

9. The non-transitory computer readable storage medium of claim 8, wherein the invalid second PUSCH allocation is indicated by at least one of:
    (a) all modulation and coding scheme (MCS) bits in the second DCI set to 1;
    (b) a frequency domain resource assignment (FDRA) configuration indicating an invalid PUSCH allocation, and
    (c) all redundancy version (RV) or NDI bits set to a fixed value of 0 or 1.

10. The non-transitory computer readable storage medium of claim 7, wherein the early termination is indicated a configuration of a second PUSCH transmission on a beam different than that of the first PUSCH transmission when intra-band carrier aggregation (CA) exists.

11. The non-transitory computer readable storage medium of claim 3, wherein when the second DCI schedules transmission of a second PUSCH transmission in a slot that overlaps in time with any of the repetitions of the first PUSCH transmission, modifying the repetitions of the first PUSCH transmission includes dropping overlapping ones of the repetitions of the first PUSCH transmission.

12. A non-transitory computer readable storage medium comprising instructions that when executed by a processor of a base station cause the processor to perform operations comprising:
    transmitting a first downlink control information (DCI) transmission from the base station of a wireless network, wherein the first DCI transmission schedules a first physical uplink shared channel (PUSCH) transmission having repetitions;
    receiving the PUSCH transmission with one or more repetitions; and transmitting a second DCI transmission from the base station, wherein the second DCI transmission indicates that the UE should modify the repetitions of the first PUSCH transmission wherein the second DCI is a group common (GC) DCI Format 2_0 that provides a dynamic slot format indication (SFI) in which one or more symbols on which the repetitions of the first PUSCH are scheduled are designated as downlink (D) symbols.

13. The non-transitory computer readable storage medium of claim 12, wherein a transceiver communicates with the UE.

14. The non-transitory computer readable storage medium of claim 13, wherein the second DCI transmission is one of a DCI Format 0_0, 0_1, or 0_2.

15. The non-transitory computer readable storage medium of claim 14, wherein the second DCI transmission schedules a second PUSCH transmission having a same hybrid automatic repeat request (HARQ) process ID as the first PUSCH transmission, and wherein the second PUSCH transmission is scheduled in at least one slot in which one of the repetitions of the first PUSCH transmission is scheduled.

16. The non-transitory computer readable storage medium of claim 14, wherein the second DCI transmission indicates an early termination of repetitions of the first PUSCH transmission.

17. The non-transitory computer readable storage medium of claim 14, wherein the second DCI schedules transmission of a second PUSCH transmission in a slot that overlaps in time with any of the repetitions of the first PUSCH transmission.

\* \* \* \* \*